United States Patent [19]
Kao et al.

[11] Patent Number: 6,119,192
[45] Date of Patent: Sep. 12, 2000

[54] CIRCUIT AND METHOD FOR CONFIGURING A BUS BRIDGE USING PARAMETERS FROM A SUPPLEMENTAL PARAMETER MEMORY

[75] Inventors: Yen-Hsiung Kao, Cupertino; Limas M. Lin; Cyrus Chu, both of Fremont, all of Calif.

[73] Assignee: Integrated Technology Express, Inc., Sunnyvale, Calif.

[21] Appl. No.: 09/176,386

[22] Filed: Oct. 21, 1998

[51] Int. Cl.[7] .............................. G06F 13/40; G06F 13/00; G06F 3/00

[52] U.S. Cl. ........................ 710/128; 710/129; 710/10; 710/104

[58] Field of Search .................................. 710/126–130, 710/8–14, 104

[56] References Cited

U.S. PATENT DOCUMENTS

| | | | |
|---|---|---|---|
| 5,355,489 | 10/1994 | Bealkowski et al. | 713/2 |
| 5,586,327 | 12/1996 | Bealkowski et al. | 713/2 |
| 5,659,748 | 8/1997 | Kennedy | 713/2 |
| 5,680,556 | 10/1997 | Begun et al. | 710/131 |
| 5,793,943 | 8/1998 | Noll | 714/6 |
| 5,797,023 | 8/1998 | Berman et al. | 713/324 |
| 5,835,760 | 11/1998 | Harmer | 713/2 |
| 5,860,001 | 1/1999 | Cromer et al. | 713/1 |
| 5,872,945 | 2/1999 | Wett | 710/126 |
| 5,872,998 | 2/1999 | Chee | 395/876 |
| 5,878,237 | 3/1999 | Olarig | 710/128 |
| 5,894,563 | 4/1999 | Saperstein | 710/129 |
| 5,938,764 | 8/1999 | Klein | 713/1 |

*Primary Examiner*—Ayaz R. Sheikh
*Assistant Examiner*—Sumati Lefkowitz
*Attorney, Agent, or Firm*—Law +

[57] ABSTRACT

A circuit and method are provided for initializing configuration registers in a bus bridge controller so that peripheral devices can acquire functionality prior to initialization by a normal system Basic Input/Output System (BIOS) routine. The initialization information is stored in a supplemental configuration Electronically Erasable Programmable Read Only Memory (EEPROM), separate from a conventional system BIOS ROM. In addition, the register configuration information is stored in a flexible format so that only certain devices are pre-configured, or that certain devices are initialized before others. The invention has particular usefulness in personal computing systems which include a Peripheral Component Interconnect (PCI) bus, an ISA bus, and a system management bus (SMB) for providing access to the EEPROM.

20 Claims, 5 Drawing Sheets

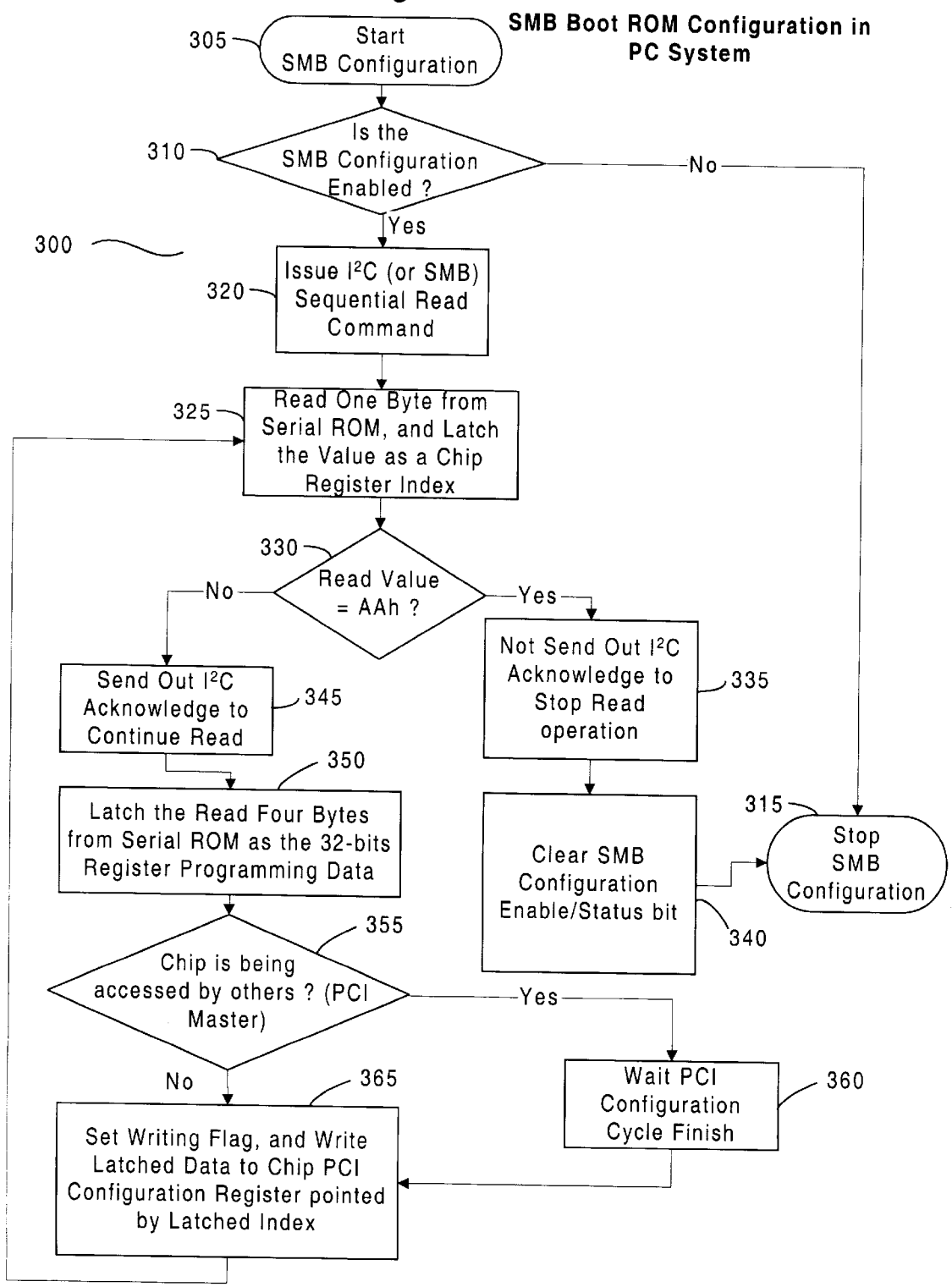

Fig. 4A

Table_1: Power-On-Strap Settings

| Symbol | Pin # | Jumper | Description |
|---|---|---|---|
| TC | 64 | (P/Up) | Enable SM-bus Boot ROM Configuration. It will set Cfg_50h<4>, but auto-cleared when finishing download configure code. |
| | | P/Down | Disable SM-bus Boot ROM Configuration |

Fig. 4B

Table_2: PCI Configuration Registers/ISA Spaces and Timing Control/Address Offset: 50hex

| Bit# | Attribute | Description | Default |
|---|---|---|---|
| <4> | RO | SM-Bus in progress. If TC is Pull/Up, this bit will be set to 1, and the SM-bus Boot ROM Configuration will be initiated. Once finished (get index=AAh), this bit will be cleared automatically | SM_Cfg_Cycle Power On Strap value of TC |

Fig. 5

| ROM Address | ROM Data | Chip Operation |
|---|---|---|
| 5n | Index = AAh | Stop |
| 5m+4 | Data | Cfg_50h<31:24> |
| 5m+3 | Data | Cfg_50h<23:16> |
| 5m+2 | Data | Cfg_50h<15:8> |
| 5m+1 | Data | Cfg_50h<7:0> |
| 5m | Index = 50h | Cfg_50h |
| 6 | Data | Cfg_XXh<7:0> |
| 5 | Index = XXh | Cfg_XXh |
| 4 | Data | Cfg_??h<31:24> |
| 3 | Data | Cfg_??h<23:16> |
| 2 | Data | Cfg_??h<15:8> |
| 1 | Data | Cfg_??h<7:0> |
| 0 | Index = ??h | Cfg_??h |

CIRCUIT AND METHOD FOR CONFIGURING A BUS BRIDGE USING PARAMETERS FROM A SUPPLEMENTAL PARAMETER MEMORY

FIELD OF THE INVENTION

The invention relates generally to a circuit and method for configuring a subsystem peripheral controller using an external programmable memory. The present invention has specific applicability to sub-system controllers used in personal computer systems which include both a PCI bus and an ISA bus.

BACKGROUND OF THE INVENTION

Contemporary computing systems, even those classified as personal computers, are steadily growing in complexity. As additional functionality is added to such systems through the addition of new and/or improved circuits and peripheral devices, a common problem that arises is where to place such circuit/peripheral within the context of the goal of improving overall system performance. To make use of the functionality of such peripheral it must of course be able to communicate with other circuits/devices in the system through some form of data/control bus. Typical contemporary computing systems include a number of data and control busses, including in some cases all or some of the following: (a) a host (processor) bus; (b) a memory access bus; (c) a primary system bus; (d) an expansion bus; (e) secondary system busses, etc. This differentiation is necessary and desirable because various components used with such busses have different performance characteristics; thus, for overall system performance it is generally the case that components of equivalent performance/characteristics are grouped on a single "bus."

One of the more common system busses used today is the so-called Peripheral Component Interconnect (PCI) bus. This bus is increasing in popularity, primarily because it is supported by a large number of personal computer system vendors as the standard of choice. A description of the characteristics and interface requirements of the PCI bus can be found at, among other places, a library of technical materials maintained by Intel at its website: www.intel.com or at developer.intel.com. Another popular but older standard bus is the Industry Standard Architecture (ISA) bus. The ISA bus is still used, even in high performance computing systems today, because many of the peripheral devices which use such bus are not able (they lack the performance capability) to reside on the PCI bus. These include, for example, such circuits and devices as floppy disk drive controllers, keyboard controllers, real time clocks, serial ports, parallel ports, game ports, general purpose I/O (GPIO), and ROM access. While there are efforts to move such circuits and other devices to higher performance busses (such as USB and 1394 Firewire), this is not cost-effective for many vendors, because it is more expensive to interface such low-cost devices to the higher performance bus systems. Accordingly, it is expected that ISA bus capability will still be needed for many more years to come.

At present, a conventional method for coupling disparate busses within a computer system is through the use of so-called "bridge" controllers. For example, a typical prior art device is the Intel 82371 AB component, which incorporates functionality for interacting and maintaining data flow between a variety of different busses, including a PCI bus, an ISA bus, an IDE bus, a USB bus, etc. A data sheet dated April 1997 describing such device, commonly known as a "South Bridge," and its operation, is also provided at the URL noted above, and such data sheet (and any later updates to the extent such are added) is incorporated herein by reference. It is expected that eventually such South Bridges will eliminate the ISA interface in order to reduce costs, and as part of an effort to prod lower performance device designers into conforming their products to the newer higher performance/functionality bus standards.

A problem that has not been addressed so far, therefore, is how to incorporate ISA bus functionality in computing systems that lack such capability in a conventional South Bridge device. A major hurdle that needs to be overcome is the fact that the PCI/ISA interface (wherever such is located) must be able to receive configuration information at start-up. Typically, this occurs by means of a system BIOS passing configuration parameters to a host CPU, which in turn executes an ISA configuration cycle at initialization, and after such cycle is claimed by the South Bridge, the CPU passes on such configuration information to the ISA interface within the South Bridge. Accordingly, it is apparent that in the absence of this interface in the South Bridge, the latter will not claim the ISA cycle, and any BIOS parameters will not be passed on to any ISA devices in the system. Thus, it is not possible with conventional architectures to pass on system configuration information in a computing system that requires ISA capability, but which includes an upgraded expansion bus bridge controller lacking an ISA interface.

A related problem arises from the fact that a conventional PCI device must first receive initialization information from a BIOS before they can proceed with many housekeeping functions. This is very undesirable, and leads to increase set up times for such devices, reducing overall system response and performance.

SUMMARY OF THE INVENTION

An object of the present invention, therefore, is to provide a circuit and method for setting up and configuring a PCI/ISA interface, even in those systems where it is not otherwise possible to do so using a conventional system BIOS/CPU initialization cycle;

Another object of the present invention is to provide a circuit and method for configuring a PCI device interface so that such device can be functional with at least some minimal operation level even before receiving system configuration information from the normal system BIOS;

A related object of the present invention is to provide a mechanism for coupling a PCI/ISA interface to a programmable memory across a system management bus for effectuating the above reference configuration cycle;

A further object of the present invention is to optimize a configuration data arrangement for such programmable memory so that the PCI/ISA interface is configured quickly and efficiently;

A preferred embodiment of a bus bridge circuit of the present invention achieves these objects by coordinating data transfers between a first PCI bus and a separate ISA bus. The bridge circuit includes a first interface coupled to the PCI bus for managing data operations between the bus bridge and PCI devices, and for receiving first initialization parameters from a system BIOS memory. A second interface is coupled to the ISA bus for managing data operations between the bus bridge and ISA devices. A third interface is coupled to a third bus (preferably an $I^2C$ bus) and is used for receiving second initialization parameters from a supplemental parameter memory separate and distinct from the system BIOS memory. A controller circuit is also used for configuring one or more of initialization registers for the ISA devices initially using the second initialization parameters.

Further in a preferred embodiment, one or more of the initialization registers can be configured at a later time using the first initialization parameters instead. The loading of the registers with the supplemental configuration information can occur even while the parameters are being retrieved from the system BIOS memory. The supplemental parameter memory is preferably an EEPROM connected to a system management bus (SMB). To increase efficiency and speed, the parameters are stored so that they may be retrieved and read in a data format corresponding to a size of one of said initialization registers. A state machine ensures that any one or more of the initialization registers can be configured in any desired sequence.

The preferred embodiment further includes an arbiter circuit for controlling access to the registers, to avoid conflicts. An enabling circuit determines at startup whether the BIOS or supplemental initialization parameters are to be used for configuring said registers.

A preferred method of configuring a controller circuit is also disclosed, which controller circuit coordinates data transfers between a first bus and a separate second bus utilizing a set of one or more configuration registers. This method includes the following steps:

(a) detecting whether a supplemental initialization procedure is enabled for the controller circuit; and
 (b) if such supplemental initialization procedure is enabled, initializing the controller circuit during a supplemental boot routine utilizing supplemental device boot information loaded into the configuration registers from a data memory coupled to such controller circuit through a third bus, which information includes parameter data associated with one or more devices located on the second bus;
 (c) otherwise, if such supplemental initialization procedure is not enabled, initializing the controller circuit utilizing device boot information loaded into the configuration registers from a System BIOS during a normal system boot up routine.

In a preferred method, the controller circuit is further configured utilizing information from the System BIOS as well. Furthermore, the data memory used is an EEPROM, and the third bus is a system management bus (SMB). The parameter data is stored so that it may be retrieved and read in a data format corresponding to a size of the configuration registers used in the controller circuit. The inventive method also stores the data so that devices on the second bus may be initialized in any desired sequence.

Further in the preferred method, the first bus is a PCI bus, the second bus is an ISA bus, and the third bus is an I²C bus, such as a system management bus (SMB). Such method further includes an additional step of controlling access to the registers so that only one of the supplemental boot routine and said normal boot routines can read or write to such registers at any instant. In this manner, supplemental device boot information can be received for configuring the registers simultaneously during a time when device boot information is being obtained from system BIOS memory for configuring the registers.

Although the inventions are described below in a preferred embodiment associated with a PCI/ISA bridge, it will be apparent to those skilled in the art the present invention would be beneficially used in many system bus applications where it is desirable to configure a peripheral device in an expedited manner prior to a normal system initialization procedure.

BRIEF DESCRIPTION OF THE DRAWINGS

FIG. 3 is a flow chart depicting the various steps carried out by a preferred configuration method of the present invention; and FIGS. 4A and 4B describe some of the registers and field settings associated with a configuration circuit of the present invention; and FIG. 5 is an illustration of register data arrangement within a programmable memory used in an preferred embodiment.

DETAILED DESCRIPTION OF THE INVENTION

Figure 1:
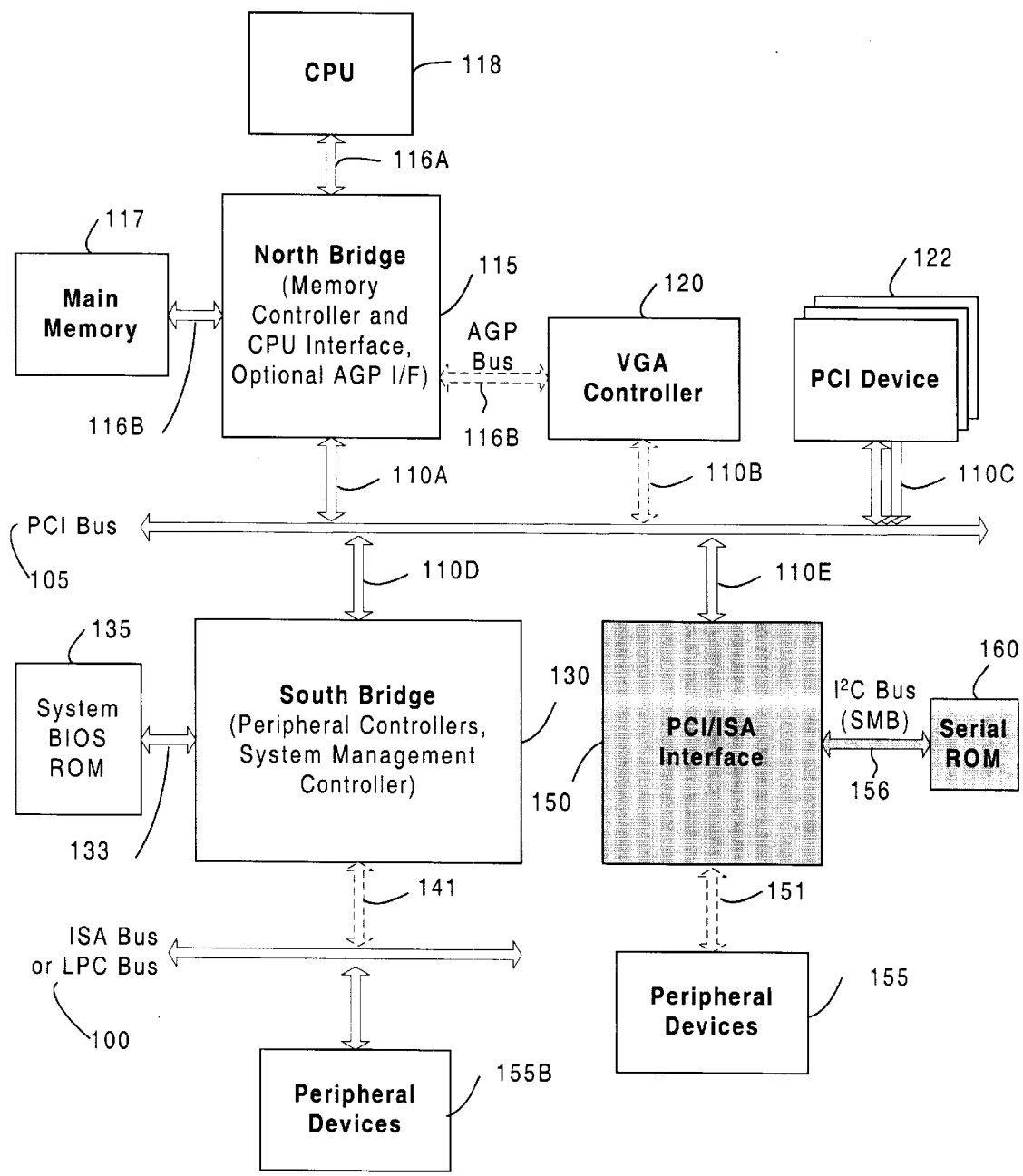
FIG. 1 is a block diagram illustrating a typical computing system environment utilizing the present invention.

A computing system 100 utilizing the present invention is illustrated in FIG. 1. A PCI bus 105 is used for interconnecting a number of directly coupled peripherals, as well as other devices based on other sub-systems. A North Bridge 115 is coupled to a Main memory 117, a CPU 118, a VGA controller 120, a PCI bus 105, and is primarily responsible for coordinating data transfers between such components, as well as to additional PCI devices 122. A South Bridge 130 in turn is coupled to, among other things, a system BIOS ROM 135, and to other data busses and associated peripherals including in some cases an IDE bus, a USB bus, an SMB bus, etc. As shown in dotted lines, in some systems, South Bridge 130 is further coupled to an ISA bus 141, and to associated peripherals 145 on such bus. System BIOS ROM 135 typically includes configuration information for every device within system 100, including those found on PCI bus 105, ISA bus 141, and any other bus. This information is usually uploaded at boot up time to CPU 118, where it is then distributed to appropriate sub-system controllers (i.e. North Bridge 115, South Bridge 130 and the like) during various initialization cycles and then used for configuring peripherals within such sub-systems, and on the various busses.

Again, in a computing system employing the present invention it is assumed that such functionality is absent from a South Bridge 130; the notation in FIG. 1 is merely provided to better illustrate the nature of the features, functions and operation of the present invention. For this reason, a new PCI/ISA interface device 150 is required to restore ISA bus capability to computing system 100 in those environments where such capability is not already present in South Bridge 130. PCI/ISA interface device 150 is directly coupled to PCI bus 105, as well as to a Supplemental Configuration Data Memory 160 (a conventional serial ROM) through an I²C bus (an SMB bus in this case), and to assorted ISA devices 155 through an ISA bus 151. These ISA bus components include, as explained below, such things as keyboards, super I/O devices, real time clocks, etc. It will be apparent to those skilled in the art that the above is merely an example of a conventional modern personal computing system incorporating the present invention, and that other variations, including some with different data path/bus routings, and additional peripherals, CPUs, and busses are of course possible and may be desirable for some applications.

Figure 2:
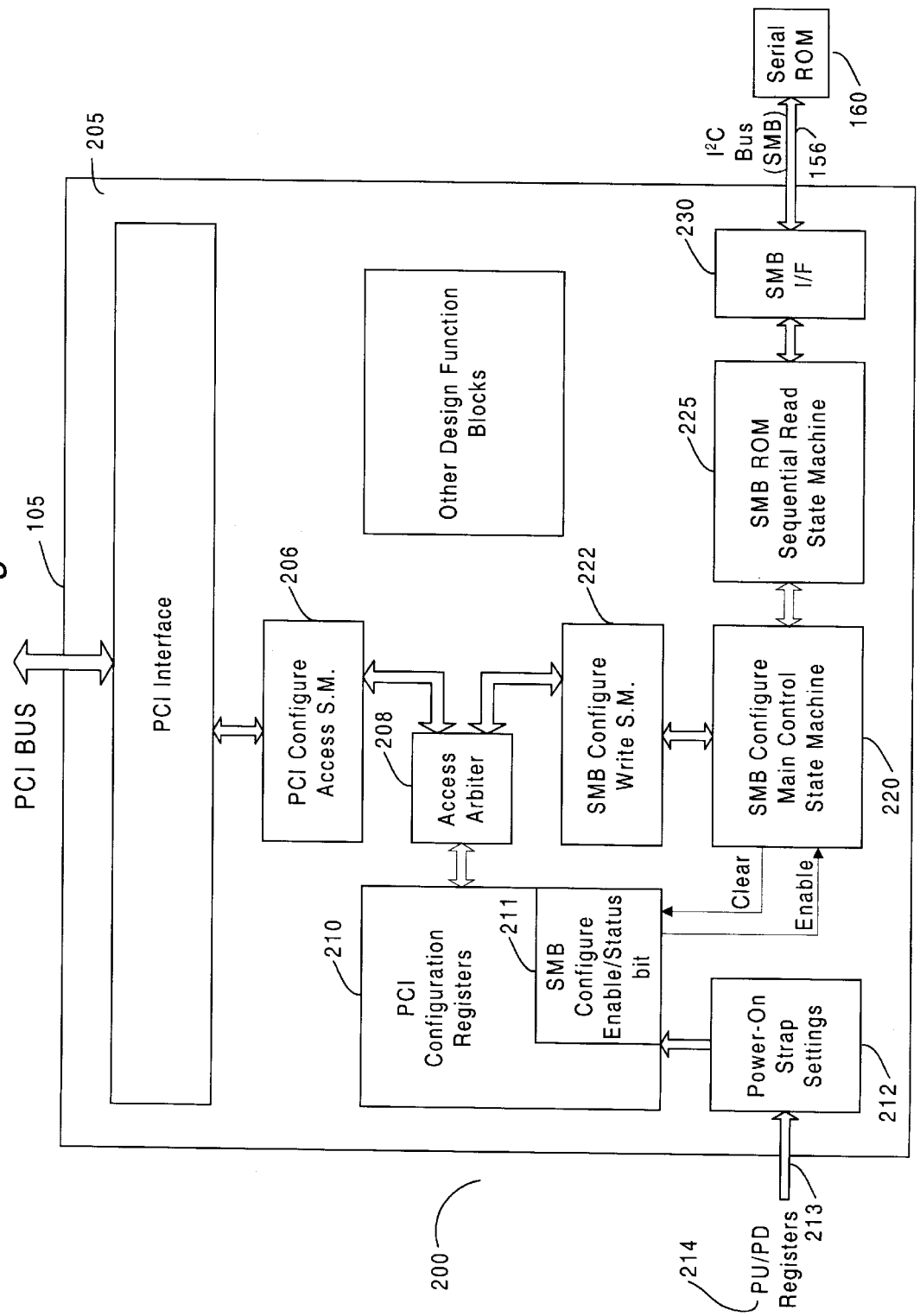
FIG. 2 is a more detailed electrical schematic diagram illustrating the various components of a preferred embodiment of an interface configuration circuit used in the present invention.

A detailed block diagram of a PCI interface portion 150' is provided in FIG. 2. For purposes of the present invention, a conventional well-known ISA interface is used in device 150 for performing control/data with ISA bus 151, and, for that reason is not detailed here. To interact with PCI bus 105, device 150 includes a PCI interface 205 which receives and interprets PCI bus commands/cycles in a conventional manner well-known in the art. PCI Interface 205 is directly coupled to PCI Configuration Access State Machine 206. The latter is responsible for among other things, receiving, decoding and buffering configuration information from System BIOS ROM 135 associated with system initialization cycles as described earlier. This circuit, in turn, is linked to an Access Arbiter 208, which circuit controls whether configuration information from System BIOS ROM 135 or Supplemental Configuration Data Memory 160 during a supplemental initialization cycle is used for initializing/updating PCI Configuration Registers 210. To provide additional flexibility, an Enable/Status Bit 211 is implemented to indicate whether PCI Configuration Registers 210 can/cannot be initialized during the supplemental initialization cycle (described in more detail below). These registers typically store configuration information for, among other things: ISA device space decoding, DMA controller setup, Option ROM space decoding, and other well known ISA related information. This supplemental cycle enable bit is set at startup by power-on strap settings 212; when set high (up) the supplemental initialization cycle is executed, and if set low (down) only the regular system initialization cycle can be used for configuring registers 210. The other input to Access Arbiter 208 is from Supplemental Configuration Write circuit 222. This latter circuit receives configuration information as passed through Configuration Main Control State Machine 220, Supplemental Configuration ROM Sequential Read State Machine 225, a System Management Bus (SMB) Interface 230, SMB bus 156 and originating from Supplemental Configuration Data Memory 160. In this manner, it can be seen that PCI Configuration Registers 210 can be set by configuration information both from a traditional PC system BIOS, as well as from a supplemental source.

The operation of a supplemental initialization cycle 300 for initializing PCI/ISA interface 150 is given in flow chart form in FIG. 3. At startup, a supplemental configuration routine executing from Configuration Main Control State Machine 220 begins at step 305. The first item verified, at step 310, is whether a supplemental configuration cycle is enabled. As described above, this is done by checking the setting of a power on strap setting provided as an input to one of the pins of PCI/Interface device 150 as noted in FIG. 4A. This value can be set by the system designer based on the identity, type, nature and operational requirements of any ISA peripherals 155 connected to PCI/Interface device 150, and other components within system 100. In many systems it is necessary, for example, for such devices to have a substantial amount of functionality immediately after startup but before general system configuration information is obtained from BIOS 135. It is impractical and inefficient to attempt to anticipate all potential system environments in advance, so power-on strap configuration routines are generally undesirable for most ISA/PCI devices. In the event the supplemental configuration cycle is enabled, status bit 211 is set high as well, as noted in FIG. 4B, to indicate that such cycle is in progress. This bit remains high until the supplemental configuration cycle is completed.

Referring back to FIG. 3: in the event the supplemental configuration cycle is not enabled, the routine ends at 315. Otherwise, a series of sequential read commands are issued at step 320 to the SMB bus to extract the necessary supplemental configuration information from serial ROM 160, and place it into PCI Configuration Registers 210. A sequential read command on an $I^2C$ bus is accomplished by issuing: (1) a Start command; (2) a write slave address with write command; (3) a write word address; (4) a write slave address with read command; (5) thereafter reading one byte at a time until a STOP value as noted below. It should be noted first that to optimize flexibility and loading time, the supplemental configuration task is done generally by performing a write to such registers after reading five (5) bytes at a time from such ROM. In this manner, the first of such read bytes acts as an index to the register set, and the latter four bytes are used to rapidly write the contents of such register to minimize delays. As noted at step 325, therefore, the first byte of five is read and latched from ROM 160 by SMB Interface 230, and thereafter the value of such byte is used as an index to register set 210. Should this value be set to "AA" hex (or some other predefined setting) this is interpreted as an indication to stop supplemental initialization routine. Such STOP value can be based either on some index value that is greater than the top of the register configuration space, or an index value that is pointing to a reserved, read-only register. Accordingly, such STOP value will vary from application to application. When the supplemental configuration routine stop value is read at step 330, a command is issued to SMB Interface 230 to cease reading from Supplemental Configuration Data Memory 160. Immediately thereafter status bit 211 is cleared, indicating the termination of the routine. At this point it should be note that status bit 211 can also be read at a later time by system BIOS 135, and a determination can be made at such time by the system BIOS software whether to permit the values as written by the supplemental configuration routine, or whether modified values are necessary. In the latter case a conventional system configuration routine can be executed to write such values. In any event, it can be seen that the present invention provides additional flexibility and time savings by permitting configuration parameters for one or more bus devices (ISA devices in this case) to be set and to have such devices mostly operational before a regular BIOS configuration routine is ever completed.

When the STOP value is not yet detected at step 330, an $I^2C$ acknowledge (in sequential read command) is issued to SMB Interface 230 at step 345 to cause the latter to continue reading data from memory 160. As indicated at 350, this data is read out four (4) bytes at a time and latched by Configuration Write circuit 222 for programming one of PCI Configuration Registers 210 as pointed to by the first byte read as noted above. Before writing this data all at once to such indexed register, however, Access Arbiter 208 first determines at step 355 whether there is a simultaneous access request to PCI Configuration registers 210 by an external PCI master through PCI bus 105. If yes, then the PCI cycle is first allowed to finish at step 360. The sequential read operation of memory 160 is continued even despite such PCI access because the latter is a significantly faster bus than the SMB used by memory 160. Even in the event there is a timing conflict, SMB Interface 230 can stretch the clock signal on SMB bus 156 to accommodate the PCI bus latency.

Assuming Access Arbiter 208 has granted Supplemental Configuration circuit 222 access to PCI Configuration Registers 210, at step 365 a write flag is first set, followed by four (4) bytes of data for the indexed register in question. By matching the data write size to the register size, data for an entire register can be loaded quickly. Supplemental data is thus continuously extracted from memory 160 until the entire supplemental configuration cycle is completed. Again, when this routine is completed, a normal system BIOS configuration routine can later modify or accept this initial configuration based on the needs of the devices attached to ISA bus 151.

In a preferred embodiment, Supplemental Configuration Data Memory 160 is a serial $E^2$ PROM which is programmed with data in the manner depicted in FIG. 5. As seen there, every fifth addressed byte, beginning with address 0, contains an index to one of PCI Configuration Registers 210. These values, of course, can be programmed in any manner desired, so that is possible to configure such register set in any desired (not just sequential) sequence. In addition, the register configuration information may include information so that only certain devices are pre-configured, or that certain devices are initialized before others. As noted before, a configuration routine "stop" value of AA (hex) is indicated at location 5n. Since memory 160 is conveniently placed on SMB 156, updates are easily implemented, and initialization is accomplished without burdening other busses within computing system 100.

The advantages of the above approach include the fact that:

1) PCI configuration registers 210 can be configured randomly, i.e., any portion of such registers, and in any desired sequence;

2) Due to the structure of the PCI configuration registers 210, each index is associated with 4 bytes of data, rather than 1, so that the chip parameters can be more efficiently configured.

Although the present invention has been described in terms of a preferred embodiment, it will be apparent to those skilled in the art that many alterations and modifications may be made to such embodiments without departing from the teachings of the present invention. Accordingly, it is intended that the all such alterations and modifications be included within the scope and spirit of the invention as defined by the following claims.

What is claimed is:

1. A bus bridge circuit for coordinating data transfers between a first bus and a separate second bus, the bus bridge circuit including:

a first interface coupled to the first bus for managing data operations between the bus bridge and first bus devices connected to the first bus, and for receiving first initialization parameters from a system Basic Input/Output System (BIOS) memory; and a second interface coupled to the second bus for managing data operations between the bus bridge and second bus devices connected to the second bus; and a third interface coupled to a third bus capable of receiving second initialization parameters from a supplemental parameter memory, which supplemental parameter memory is separate and distinct from said system BIOS memory; and a controller circuit for configuring initialization registers in the bus bridge circuit associated with said second bus devices, said controller circuit configuring one or more of said initialization registers initially using said second initialization parameters.

2. The circuit of claim 1, wherein said one or more of said initialization registers are configured at a later time using said first initialization parameters.

3. The circuit of claim 1, wherein said second initialization parameters are obtained from a supplemental parameter memory connected to said third bus, which parameter memory is an Electronically Erasable Programmable Read Only Memory (EEPROM), and which third bus is a system management bus (SMB).

4. The circuit of claim 3, wherein said parameters are stored so that they may be retrieved and read in a data format corresponding to a size of one of said initialization registers.

5. The circuit of claim 4, wherein said parameters are stored so that said second bus devices may be initialized in any desired sequence.

6. The circuit of claim 1, wherein said first bus is a Peripheral Component Interconnect (PCI) bus, and said second bus is an Industry Standard Architecture (ISA) bus.

7. The circuit of claim 6, wherein said third bus is a system management bus (SMB).

8. The circuit of claim 1, further including an arbiter circuit for controlling access to said registers by said first and third interfaces.

9. The circuit of claim 1, further including an enabling circuit, which enabling circuit determines whether second initialization parameters are to be used for configuring said registers.

10. The circuit of claim 1, further including a write circuit for writing said second initialization parameters using a data format corresponding to a size of one of said initialization registers.

11. The circuit of claim 1, wherein said second initialization parameters can be received even while said first initialization parameters are being obtained said system BIOS memory.

12. A method of configuring a controller circuit, which controller circuit coordinates data transfers between a first bus and a separate second bus utilizing a set of one or more configuration registers, the method including the steps of:

(a) detecting whether a supplemental initialization procedure is enabled for the controller circuit; and (b) if said supplemental initialization procedure is enabled, initializing the controller circuit during a supplemental boot routine utilizing supplemental device boot information loaded into the configuration registers from a data memory coupled to such controller circuit through a third bus, which information includes parameter data associated with one or more devices located on the second bus;

(c) otherwise, if said supplemental initialization procedure is not enabled, initializing the controller circuit utilizing device boot information loaded into the configuration registers from a System Basic Input/Output System (BIOS) during a normal system boot up routine.

13. The method of claim 12, further including a step after step (b): initializing the controller circuit utilizing information from said System BIOS as well.

14. The method of claim 12, wherein said data memory is an Electronically Erasable Programmable Read Only Memory (EEPROM), and which third bus is a system management bus (SMB).

15. The method of claim 12, wherein said parameter data is stored so that it may be retrieved and read in a data format corresponding to a size of the configuration registers used in the controller circuit.

16. The method of claim 15, wherein said parameter data is stored so that said devices on the second bus may be initialized in any desired sequence.

17. The method of claim 12, wherein said first bus is a Peripheral Component Interconnect (PCI) bus, and said second bus is an Industry Standard Architecture (ISA) bus.

18. The method of claim 17, wherein said third bus is a system management bus (SMB).

19. The method of claim 12, further including a step (d): controlling access to said registers so that only one of said supplemental boot routine and said normal boot routine can read or write to said registers at any instant.

20. The method of claim 12, wherein said supplemental device boot information can be received for configuring the registers during a time when said device boot information is being obtained from said system BIOS memory for configuring the registers.

* * * * *